United States Patent [19]
Fung

[11] Patent Number: 5,862,766
[45] Date of Patent: Jan. 26, 1999

[54] CONVERTIBLE SEWING MACHINE

[76] Inventor: Man Kit Fung, G/F.-2/F., 89-91 Lai Chi Kok Road, Sham Shui Po, Kowloon, Hong Kong

[21] Appl. No.: 918,468

[22] Filed: Aug. 26, 1997

[30] Foreign Application Priority Data

Jan. 8, 1997 [CN] China ................................ 97106205.6

[51] Int. Cl.⁶ .................................................. D05B 25/00
[52] U.S. Cl. ............................ 112/168; 112/155; 112/258
[58] Field of Search ...................................... 112/168, 163, 112/172, 162, 36, 165, 166, 167, 258, 155, 220

[56] References Cited

U.S. PATENT DOCUMENTS 4,267,786  5/1981  Hanyu et al. ............................ 112/168
4,333,410  6/1982  Taketomi .............................. 112/168 X
4,445,450  5/1984  Ebata .................................. 112/168 X

*Primary Examiner*—Peter Nerbun
*Attorney, Agent, or Firm*—Alix, Yale & Ristas, LLP

[57] ABSTRACT

A convertible sewing machine utilizes plain-seaming and closed-seaming head assemblies to provide both plain-seaming and closed-seaming functions in a single integral package. The convertible sewing machine includes a housing having opposing ends, a plain-seaming head-assembly disposed at one end of the housing, a closed-seaming head-assembly disposed at the other end of the housing, a drive motor and a drive-coupling assembly for mechanically coupling the drive motor and at least one of the plain-seaming and closed-seaming head-assemblies. The drive-coupling assembly is capable of selectively engaging either, or both of, the head-assemblies. A turntable mechanism can also be included for rotating the convertible sewing machine into several positions of operation.

14 Claims, 5 Drawing Sheets

CONVERTIBLE SEWING MACHINE

BACKGROUND OF THE INVENTION

1. Field of the Invention

The present invention generally relates to sewing machines of the type used in the garment industry. More particularly, the present invention is directed to a convertible sewing machine which is capable of performing plain-seaming as well as closed-seaming functions. Accordingly, the general objects of the present invention are to provide novel and improved methods and apparatus of such character.

2. Description of the Related Art

Sewing machines have been a main-stay of the garment manufacturing industry for many years. In fact, since its invention, the sewing machine has become such an important tool in the garment industry, that many variations thereof have been developed. Nonetheless, most of these garment manufacturing sewing machines can be divided into two general classifications.

The first class of sewing machines may be termed "plain-seaming" sewing machines. Plain-seaming sewing machines are designed to sew two pieces of material to one another. A typical plain-seaming sewing machine is depicted in FIG. 1. As shown therein, the sewing machine primarily includes a housing which has a base plate, a working panel and a front panel. Further, a plain-seaming head-assembly is disposed at one end of the housing, and power and drive gears are disposed within the housing of the sewing machine. As shown in FIG. 1, the driving force for the machine is applied to a bent shaft 6 by a belt connected between an originating power source (not shown) and one end of shaft 6. This driving force will then be transferred through connecting rod 8 to a lower shaft 9 to cause rotation of lower shaft 9. The driving force is also transferred through the connecting rod 16 to the material-feeding shaft 25. Thus, once the initiating drive force is applied to bent shaft 6, the cooperation of the various components will initiate operation of the sewing machine.

A second class of sewing machines may be referred to as "closed-seaming" sewing machines. Closed-seaming sewing machines are used to sew the exposed edge of a piece of cloth to prevent the exposed fibers of the edge from fraying. A typical closed-seaming sewing machine is depicted in FIG. 2. As shown therein, the sewing machine includes a lower shaft 13 which receives a driving force from an initiating power source (not shown) via a drive belt, the belt causing rotation of lower shaft 13. The drive force is then transferred from lower shaft 13 to needle bar shaft 15 through connecting rod 14. This results in rotation of needle bar shaft 15 and reciprocation of needle bar 26. The needle bar 26 and the components associated therewith comprise a closed-seaming head-assembly which will operate upon the application of the initiating driving force to lower shaft 13.

Both closed-seaming and plain-seaming sewing machines are currently being widely used throughout the garment manufacturing industry. However, despite their wide-spread use and importance, the use of these machines is somewhat expensive, inefficient and inconvenient. The primary cause of such deficiencies resides in the closed-seaming and plain-seaming sewing machines taking the form of individually dedicated machines. Thus, the need for garment manufacturers to own and utilize both types of sewing machines has resulted in the reduced efficiencies noted above.

Therefore, there remains a need in the art for an improved sewing machine which overcomes the aforementioned deficiencies of the related art by providing a single sewing machine which is capable of performing both plain-seaming and closed-seaming functions.

SUMMARY OF THE INVENTION

It is accordingly an object of the present invention to provide a convertible sewing machine which is capable of sewing material fed therethrough in either, or both of, plain-seaming or closed-seaming modes.

It is another object of the present invention to provide an improved sewing machine which is capable of performing both plain-seaming and closed-seaming functions to thereby provide an optimal combination of (1) simplicity; (2) economy; (3) efficiency; and (4) versatility.

These and other objects and advantages of the present invention are provided in one embodiment by a convertible sewing machine capable of performing both plain-seaming and closed-seaming functions of conventional sewing machines. By eliminating unnecessary duplication of components, the convertible sewing machine of the present invention is more economical, space efficient and portable than the plain-seaming and closed-seaming sewing machines which it replaces. The convertible sewing machine of the present invention includes a frame assembly such as a housing have opposing first and second ends. A plain-seaming head assembly is disposed at the first end of the frame assembly. This plain-seaming head assembly is capable of sewing, in plain-seaming fashion, material fed therethrough when a driving force is applied to the head-assembly. The inventive sewing machine further comprises a closed-seaming head-assembly disposed at the second end of the frame assembly. This closed-seaming head-assembly is capable of sewing, in closed-seaming fashion, material fed therethrough upon delivery of a driving force to the head-assembly. The initiating force is supplied by a drive motor disposed within the frame assembly and having a rotatable shaft extending from at least one end thereof. In operation, the drive motor rotates the rotatable shaft. Finally, the convertible sewing machine of the present invention includes a drive-coupling assembly disposed within the frame assembly for mechanically coupling the plain-seaming and/or closed-seaming head assemblies to the rotatable motor shaft. Thus, the drive-coupling assembly cooperates with the drive motor and head assemblies to selectively deliver a driving force to at least one of the plain-seaming and closed-seaming assemblies when the motor shaft rotates. The drive-coupling assembly can, optionally, include a clutch mechanism for selecting which of the head assemblies receives a driving force from the drive motor. Preferably, this clutch mechanism enables either one or both of the plain-seaming and closed-seaming head-assemblies to operate at any given time. Preferably, this mechanism also includes a user operable lever which extends outwardly from the frame assembly and which can be shifted to select the desired function.

Another optional feature of the present invention includes the addition of a turntable for allowing rotation of the sewing machine. The turntable preferably includes a manually actuatable lever which allows the user to select between locking and rotating modes of the turntable. Utilizing the turntable, a single user can quickly and conveniently switch between either feature of the present invention without changing working positions. Alternatively, two users, each located at respective opposite ends of the sewing machine, could utilize the inventive sewing machines simultaneously.

One clear advantage of the present invention over the related art is that the inventive sewing machine is compact, its size being similar to either one of a conventional plain-seaming or a conventional closed-seaming sewing machine. Naturally, both space and operating efficiencies flow from the convenience of having both sewing functions available from a single machine of one small package.

Numerous other advantages and features of the present invention will become apparent to those of ordinary skill in the art from the following detailed description of the invention, from the claims, and from the accompanying drawings.

BRIEF DESCRIPTION OF THE DRAWINGS

The preferred embodiment of the present invention will be described below with reference to the accompanying drawings wherein like numerals represent like structures and wherein.

DESCRIPTION OF THE PREFERRED EMBODIMENT

The preferred embodiment of the present invention will now be described with joint reference to FIGS. 3–6. Those of ordinary skill in the art will readily appreciate that the convertible sewing machine of the present invention is designed to sew woven fabric fed therethrough. However, it will also be appreciated that the present invention can be used to sew a number of other woven or non-woven materials which can be fed therethrough such as sheets of plastic, leather, paper, etc.

Figure 1:
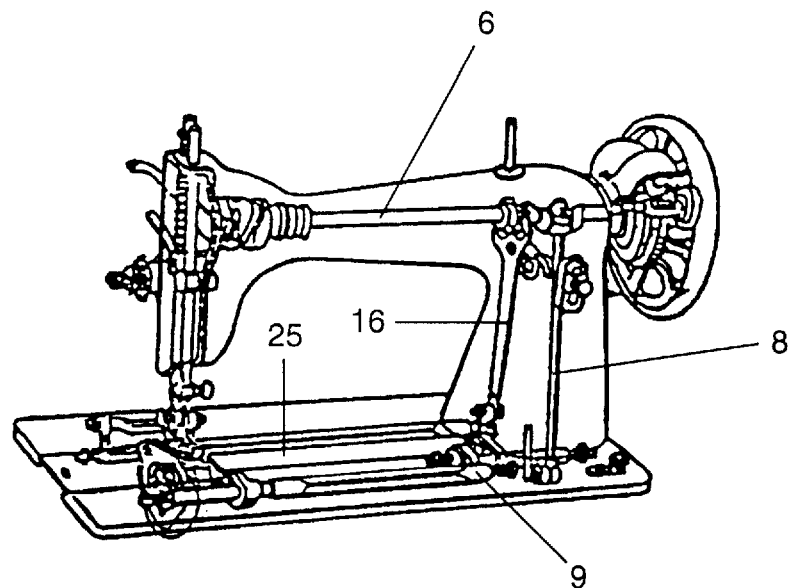
FIG. 1 is a schematic representation of a conventional plain-seaming sewing machine of the related art.
Figure 2:
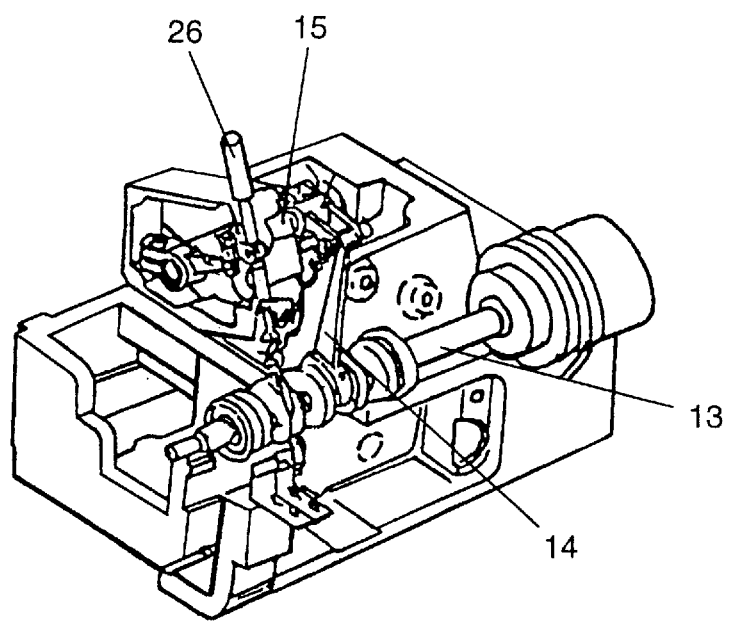
FIG. 2 is a schematic representation of a conventional closed-seaming sewing machine of the related art.
Figure 3:
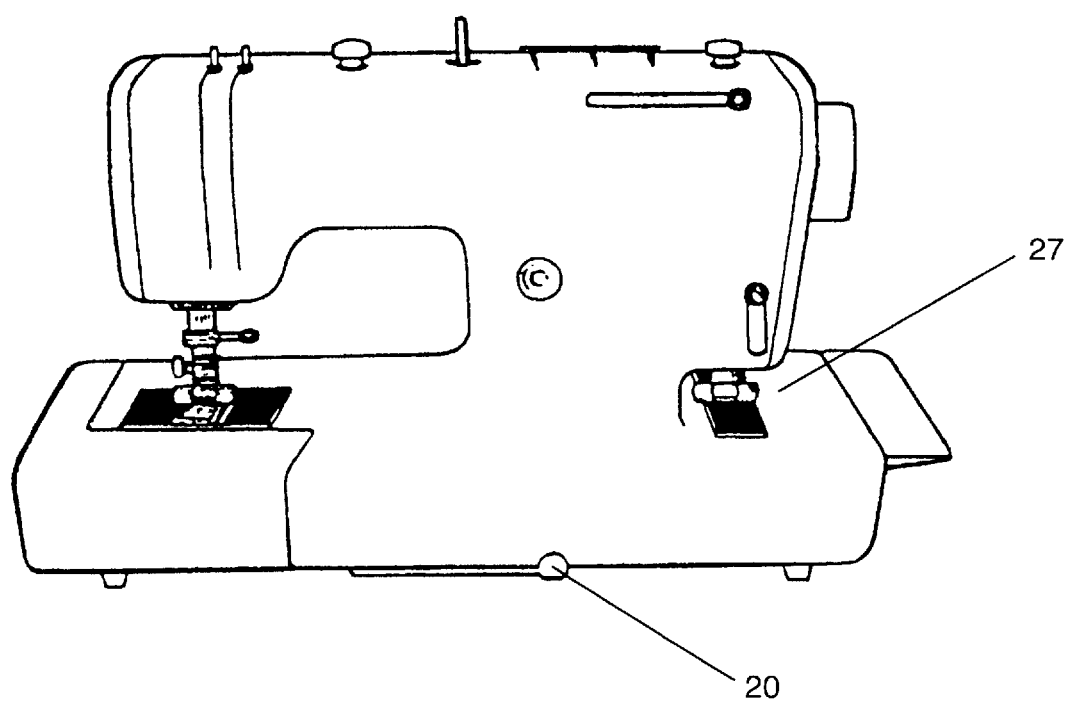
FIG. 3 is a perspective view of the preferred embodiment of the convertible sewing machine of the present invention.
Figure 4A:
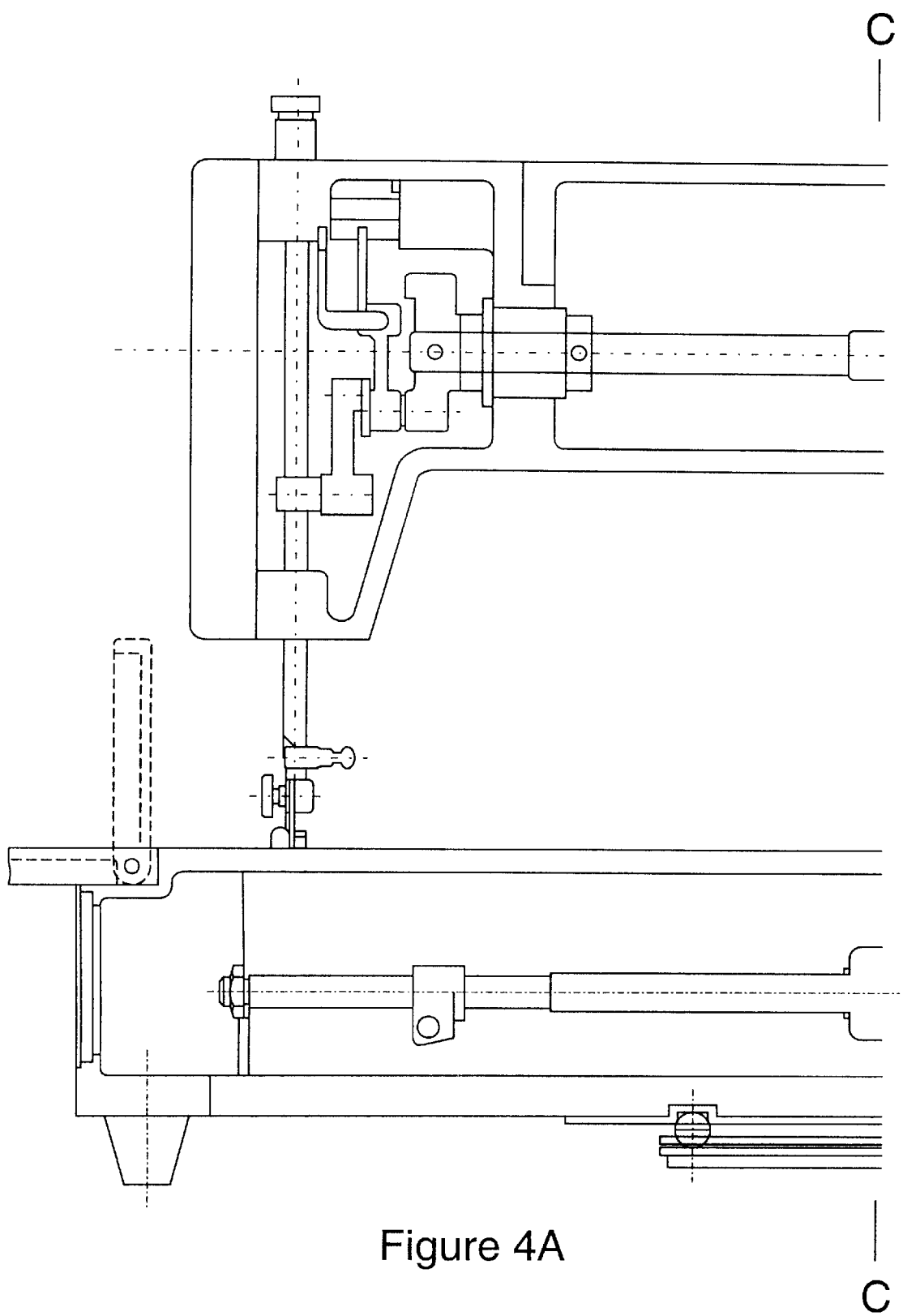
FIGS. 4A and 4B are side elevational views, partly broken away, partly in section and partly in schematic, of the preferred embodiment of the convertible sewing machine of the present invention, wherein FIGS. 4A and 4B may be combined along line C—C.
Figure 4B:
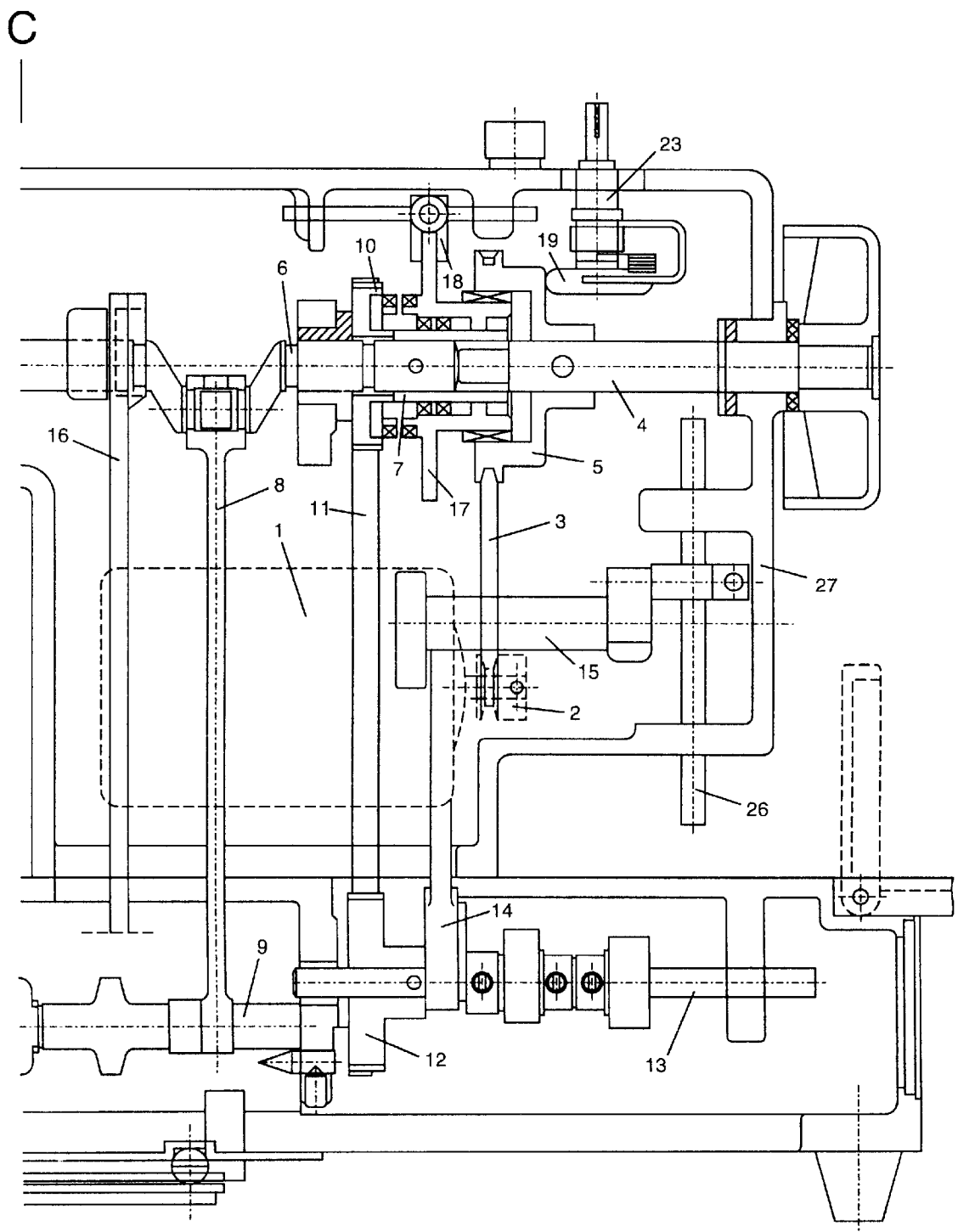
Figure 5:
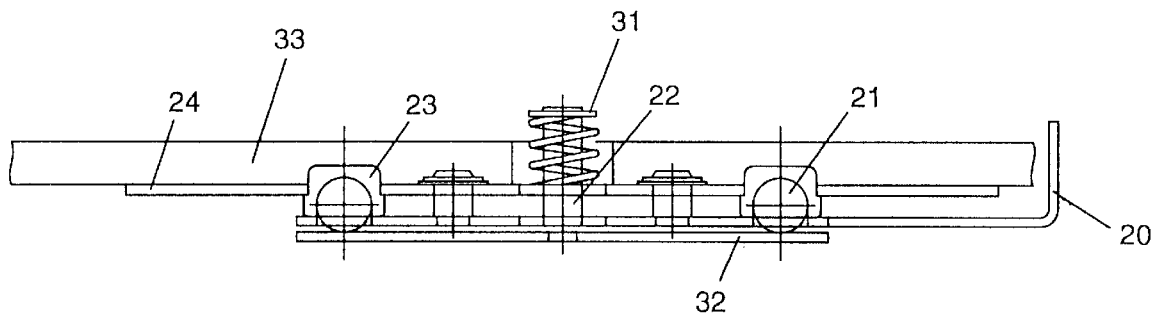
FIG. 5 is an enlarged, fragmentary side view of a turntable for the embodiment of FIGS. 4A and 4B of the present invention.

As shown in FIGS. 4A and 4B, the preferred convertible sewing machine of the invention includes a frame assembly in the form of a housing 27 having first and second opposed ends. The preferred convertible sewing machine of the present invention also includes a plain-seaming head-assembly on the left hand side thereof and a closed-seaming head-assembly on the right hand side thereof. A motor 1 is disposed within the housing. A rotatable drive shaft extends from one end of motor 1 and defines an axis of rotation. A first pulley 2 is fixed to the motor shaft. An upper shaft 4 is rotatably mounted to housing 27 for rotation about an axis which is parallel to the motor shaft axis. A second pulley 5 is mounted on upper shaft 4, and a first belt 3 is firmly disposed around first and second pulleys 2 and 5 such that rotation of the motor shaft causes rotation of first and second pulleys 2 and 5 as well as upper shaft 4.

A clutch assembly 17 is disposed within housing 27 and partially within the interior of second pulley 5. One end of clutch assembly 17 includes an outwardly splined tooth-region which mates with an inner splined tooth-region of pulley 5. Accordingly, rotation of pulley 5 causes corresponding rotational movement of clutch assembly 17 about the axis defined by upper shaft 4.

A bent shaft 6 is preferably disposed with upper shaft 4 and mounted within housing 27 for coaxial rotation about the axis of upper shaft 4. However, bent shaft 6 is freely rotatable relative to upper shaft 4 in the absence of selective engagement between clutch assembly 17 and bent shaft 6. A connecting rod 8 is received on a sliding bushing portion of bent shaft 6 and extends downwardly therefrom. A third pulley 10 is fixedly attached to another sliding bushing of bent shaft 6.

A lower shaft 13 is disposed within housing 27 for rotation about an axis which is parallel to the motor shaft axis. A fourth pulley 12 is fixedly mounted at one end of lower shaft 13, and a second belt 11 is snugly received around third and fourth pulleys 10 and 12. Thus, rotation of bent shaft 6 causes corresponding rotation of third and fourth pulleys 10 and 12 and, ultimately, rotation of lower shaft 13.

A connecting rod 14 forms part of the closed-seaming head assembly and is engaged with a sliding bushing of the needle bar shaft 15. Also, one end of needle bar shaft 15 is operably associated with needle bar 26 such that rotation of lower shaft 13 delivers a driving force to the closed-seaming head-assembly.

Figure 6:
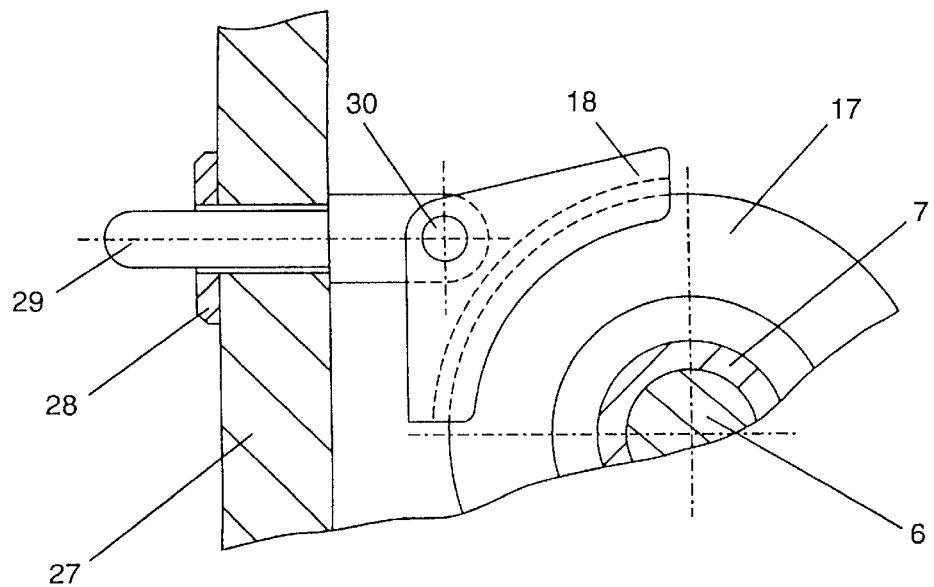
FIG. 6 is an enlarged, fragmentary end view, partly in section and partly in schematic and with portions removed, of the clutch mechanism depicted in FIG. 4B.

A shaft sleeve 7 is fixed to bent shaft 6 and shaft sleeve 7 is slidably connected to the clutch assembly 17. As seen in FIGS. 4B and 6, a user-operable forked lever 18, 29 extends through housing 27 such that one end thereof extends outwardly of housing 27 and another end thereof is disposed within housing 27. The portion of forked lever 18, 29 within housing 27 is capable of engaging clutch assembly 17 to adjust the position of clutch assembly 17. The user-operable fork lever 18, 29 is guided along a small shaft 30 which extends parallel to the motor shaft axis. Thus, fork lever 18, 29 is capable of reciprocal movement between the first and second ends of housing 27 whereby clutch assembly 17 slides coaxially with the axis of upper shaft 4.

In operation, motor 1 causes rotation of the motor shaft extending therefrom which imparts corresponding rotational motion to first and second pulleys 2 and 5 (due to engagement thereof with belt 3) and upper shaft 4. Additionally, the mating engagement between the splined teeth of clutch 17 and pulley 5 causes rotation of clutch 17. Since clutch 17 is slidably disposed about shaft sleeve 7 of bent shaft 6, clutch assembly 17 may move freely along shaft 6 in the direction of the axis of upper shaft 4. This sliding motion of clutch assembly 17 can be accomplished by the user by sliding forked lever 18, 29 to the desired position. From the view shown in FIGS. 4A and 4B, sliding forked lever 18, 29 to the left engages the plain-seaming head-assembly, and sliding forked lever 18, 29 to the right engages the closed-seaming head-assembly. When clutch assembly 17 is moved to the right (as viewed from FIGS. 4A and 4B), a toothed interior thereof mates with a tooth exterior surface of shaft sleeve 7 and shaft sleeve 7 begins to rotate. Naturally, this also causes rotation of bent shaft 6 which then delivers a driving force to the plain-seaming head-assembly. In particular, the driving forces transferred to second lower shaft 9 via connecting rod 8. Additionally, the driving force is then transferred to a right shaft through connecting rod 16 to impart movement to a material feeder. Moreover, rotation of bent shaft 6 applies additional driving force to the remainder of the plain-seaming head-assembly shown in the left hand corner of FIG. 4A as known in the art. Finally, wheel 19 is frictionally engaged with pulley 5 such that rotation of the pulley 5 causes the small shaft attached thereto to rotate for thread unwinding.

When clutch assembly 17 is moved to the left hand side as shown in FIGS. 4A and 4B, another splined region of clutch assembly 17 will engage with the splined region of pulley 10 to cause rotation of pulley 10 along with rotation of clutch assembly 17. Thus, fourth pulley 12 and lower shaft 13 will rotate along with third pulley 10 due to engagement therebetween by second belt 11. The rotation of lower shaft 13 thus applies a driving force to the closed-seaming head-assembly due to the cooperating movement of connecting rod 14, needle bar shaft 15 and needle bar 26.

When clutch assembly 17 is positioned in a central position as shown in FIGS. 4A and 4B, both the plain-seaming assembly and the closed-seaming head-assemblies are engaged for operation.

In order to facilitate usage of the inventive convertible sewing machine by a user without requiring the user to change position, the preferred embodiment of the present invention also includes a turntable feature for reorienting the inventive sewing machine. Restated, the turntable feature of the present invention enables a user to operate the plain-seaming and closed-seaming functions from the same working position. With primary reference now to FIG. 5, the turntable 24 is disposed beneath a base plate 33 of housing 27. A stationary support member, preferably four legs extending below baseplate 33 of housing 27, normally supports housing 27 in a fixed location. Turntable 24 includes a turning shaft 22 and a bottom panel 32 which is rotatably affixed to turning shaft 22. A lever 20 is rotatably affixed about turning shaft 22 and is disposed between base plate 33 of housing 27 and bottom panel 32 of turntable 24. A plurality of steel ball bearings 21 are disposed within a ball race 23 of varying depth and within a portion of lever 20 such that rotation of lever 20 will cause ball bearings 21 to rotate within ball race 23 by a corresponding amount. Also, a compression spring 31 is disposed about turning shaft 22 to urge ball race 23 of base plate 33 downwardly toward bottom panel 32. Preferably, ball race 23 includes regions of different depths along the circumference thereof to provide for the reception of ball bearings 21 therein such that the distance between base plate 33 and bottom panel 32 varies with the rotational position of ball bearings 21. In this position, the legs of the stationary support member support the sewing machine from a surface and bottom panel 32 is raised above the surface.

In operation, turntable 24 is actuated for rotation when a user pulls lever 20 at the front lower part of the inventive sewing machine in leftward rotation to the position shown in FIG. 4B. Lever 20 will move the ball bearings 21 to a subsequent fixed position. For example, if lever 20 is rotated 60°, it will drive steel ball 21 to turn 60° on the circumference of ball race 23. As the steel balls 21 move along ball race 23, the balls 21 will move from a deep part of ball race 23 towards a shallow part thereof. Thus, the distance between bottom panel 32 and base plate 33 will increase. The bottom surface of bottom panel 32 then touches the work table surface until the four legs are raised above the surface of the work space. The convertible sewing machine of the present invention can then be horizontally rotated about an axis defined by turning shaft 22. The plain-seaming and closed-seaming portions of the sewing machine can, thus, be reversed by such rotation, making it possible for the user to utilize either portion of the sewing machine without changing position. Finally, returning lever 22 to its original position will reset the legs of the sewing machine back onto the work surface. This procedure can be repeated as desired.

While the present invention has been described in connection with what is presently considered to be the most practical and preferred embodiments, it is to be understood that the invention is not limited to the disclosed embodiments, but is intended to cover various modifications and equivalent arrangements included within the spirit and scope of the appended claims.

What is claimed is:

1. A convertible sewing machine for sewing together material fed therethrough, said sewing machine comprising:

a frame assembly having opposing first and second ends;

a plain-seaming head-assembly disposed at said first end of said frame assembly, said plain-seaming head-assembly being capable of plain-seaming material fed therethrough upon the delivery of a driving force thereto:

a closed-seaming head-assembly disposed at said second end of said frame assembly, said closed-seaming head-assembly being capable of closed-seaming material fed therethrough upon the delivery of a driving force thereto;

a drive motor disposed within said frame assembly and having a rotatable shaft extending therefrom, said motor shaft defining an axis and said drive motor being capable of rotating said motor shaft about said axis; and a drive-coupling assembly disposed within said frame assembly and cooperating with said drive motor and said plain-seaming and closed-seaming head-assemblies to selectively deliver a driving force to at least one of said plain-seaming and closed-seaming head-assemblies in response to rotation of said motor shaft whereby at least one of said plain-seaming and closed-seaming head-assemblies sews together material fed therethrough, said drive-coupling assembly comprising:

a rotatable upper shaft disposed parallel to said axis and operably associated with said motor shaft for rotation therewith;

a rotatable bent shaft disposed parallel to said axis and aligned with said upper shaft, said bent shaft being freely rotatable relative to said upper shaft and operably associated with said plain-seaming head-assembly such that said bent shaft delivers a driving force to said plain-seaming head-assembly upon rotation of said bent shaft;

a rotatable lower shaft disposed parallel to said axis, said lower shaft being freely rotatable relative to said upper shaft and operably associated with said closed-seaming head-assembly such that said lower shaft delivers a driving force to said closed-seaming head-assembly upon rotation of said lower shaft; and a clutch assembly for selectively engaging at least one of said bent and lower shafts with said upper shaft whereby rotation of said upper shaft causes rotation of at least one of said bent and lower shafts.

2. The sewing machine of claim 1, wherein said drive-coupling assembly further comprises:

user-operable means for causing said clutch assembly to selectively engage at least one of said bent and lower shafts with said upper shaft, said user-operable means being mounted for reciprocal movement along a path defined between said first and second ends of said housing, having an outer end extending outwardly of said frame assembly and having an inner end which is disposed within said frame assembly.

3. The sewing machine of claim 1, wherein said frame assembly is a housing.

4. The sewing machine of claim 3, wherein said drive-coupling assembly further comprises:

user-operable means for causing said clutch assembly to selectively engage at least one of said second and third shafts with said first shaft, said user-operable means having an outer end extending outwardly of said housing and an inner end which is disposed within said housing and engages said clutch assembly.

5. A convertible sewing machine for sewing together material fed therethrough, said sewing machine comprising:

a frame assembly having opposing first and second ends, a baseplate at a bottom end thereof, and at least one stationary support member which extends below said baseplate;

a plain-seaming head-assembly disposed at said first end of said frame assembly, said plain-seaming head-assembly being capable of plain-seaming material fed therethrough upon the delivery of a driving force thereto;

a closed-seaming head-assembly disposed at said second end of said frame assembly, said closed-seaming head-assembly being capable of closed-seaming material fed therethrough upon the delivery of a driving force thereto;

a drive motor disposed within said frame assembly and having a rotatable shaft extending therefrom, said drive motor being capable of rotating said motor shaft;

a drive-coupling assembly disposed within said frame assembly, said drive-coupling assembly cooperating with said drive motor and said plain-seaming and closed-seaming head-assemblies to selectively deliver a driving force to at least one of said plain-seaming and closed-seaming head-assemblies in response to rotation of said motor shaft whereby at least one of said plain-seaming and closed-seaming head-assemblies sews together material fed therethrough; and a turntable having a variable-depth ball race, a turning shaft, a bottom panel rotatably affixed about said turning shaft, a compression spring disposed between said baseplate and said bottom panel for urging said baseplate and said bottom panel toward one another, a plurality of ball bearings disposed within said ball race to permit free rotation of said frame assembly relative to said bottom panel of said turntable about said turning shaft, and rotatable lever means for selectively urging said ball bearings along said ball race whereby the distance between said baseplate and said bottom panel varies.

6. The sewing machine of claim 5, wherein said ball race is circular and includes a varying depth around the circumference thereof whereby when said ball bearings are urged around said ball race said bottom panel is urged away from said base plate.

7. A convertible sewing machine for sewing together material fed therethrough, said sewing machine comprising:

a frame-assembly having opposing first and second ends;

a plain-seaming head-assembly disposed at said first end of said frame assembly, said plain-seaming head-assembly being capable of plain-seaming material fed therethrough upon the delivery of a driving force thereto;

a closed-seaming head-assembly disposed at said second end of said frame assembly, said closed-seaming head-assembly being capable of closed-seaming material fed therethrough upon the delivery of a driving force thereto;

a drive motor disposed within said frame assembly and having a rotatable shaft extending therefrom, said drive motor being capable of rotating said motor shaft;

a drive-coupling assembly disposed within said frame assembly, said drive-coupling assembly cooperating with said drive motor and said plain-seaming and closed-seaming head-assemblies to selectively deliver a driving force to at least one of said plain-seaming and closed-seaming head-assemblies in response to rotation of said motor shaft whereby at least one of said plain-seaming and closed-seaming head-assemblies sews together material fed therethrough;

at least one stationary support member extending downwardly of said frame assembly, a rotatable turntable fixedly attached to said frame assembly, said turntable including a turning shaft, a bottom panel which is freely rotatable about said turning shaft relative to said frame assembly; and means for selectively moving said bottom panel relative to said stationary support member.

8. The sewing machine of claim 1, wherein said frame assembly includes a baseplate at a bottom end thereof, and a plurality of legs which extend from said baseplate;

said sewing machine further comprises a turntable having a variable-depth ball race, a turning shaft, a bottom panel rotatably affixed about said turning shaft, a compression spring disposed between said baseplate and said bottom panel for urging said baseplate and said bottom panel toward one another, a plurality of ball bearings disposed within said ball race to permit free rotation of said frame assembly relative to said bottom panel of said turntable about said turning shaft, and rotatable lever means for selectively urging said ball bearings along said ball race whereby the distance between said baseplate and said bottom panel varies.

9. The sewing machine of claim 2, wherein said frame assembly comprises a housing having a baseplate at a bottom end thereof, and a plurality of legs which extend below said baseplate;

said sewing machine further comprises a turntable having a variable-depth ball race, a turning shaft, a bottom panel rotatably affixed about said turning shaft, a compression spring disposed between said baseplate and said bottom panel for urging said baseplate and said bottom panel toward one another, a plurality of ball bearings disposed within said ball race to permit free rotation of said housing relative to said bottom panel of said turntable about said turning shaft, and rotatable lever means for selectively urging said ball bearings along said ball race whereby the distance between said baseplate and said bottom panel varies.

10. The sewing machine of claim 3, wherein said housing includes a baseplate at a bottom end thereof, and a plurality of stationary support members which extend downwardly from said baseplate;

said sewing machine further comprises a turntable having a variable-depth ball race, a turning shaft, a bottom panel rotatably affixed about said turning shaft, a compression spring disposed between said baseplate and said bottom panel for urging said baseplate and said bottom panel toward one another, a plurality of ball bearings disposed within said ball race to permit free rotation of said housing relative to said bottom panel of said turntable about said turning shaft, and rotatable lever means for selectively urging said ball bearings along said ball race whereby the distance between said baseplate and said bottom panel varies.

11. The sewing machine of claim 1, wherein said sewing machine further comprises a plurality of stationary support members extending from said frame assembly and a rotatable turntable fixedly attached to said frame assembly, said turntable including a turning shaft, a bottom panel which is freely rotatable about said turning shaft relative to said frame assembly and means for selectively moving said bottom panel relative to said stationary support member.

12. The sewing machine of claim 2, wherein said frame assembly is a housing, and wherein said sewing machine further comprises a plurality of legs extending from said housing and a rotatable turntable fixedly attached to said housing, said turntable including a turning shaft, a bottom panel which is freely rotatable about said turning shaft relative to said housing and means for selectively moving said bottom panel relative to said legs.

13. The sewing machine of claim 3, wherein said sewing machine further comprises at least one stationary support member extending from said housing and a rotatable turntable fixedly attached to said housing, said turntable including a turning shaft, a bottom panel which is freely rotatable about said turning shaft relative to said housing and means for selectively moving said bottom panel relative to said stationary support member.

14. A convertible sewing machine for sewing together material fed therethrough, said sewing machine comprising:

a frame assembly having opposing first and second ends;

a plain-seaming head-assembly disposed at said first end of said frame assembly, said plain-seaming head-assembly being capable of plain-seaming material fed therethrough upon the delivery of a driving force thereto;

a closed-seaming head-assembly disposed at said second end of said frame assembly, said closed-seaming head-assembly being capable of closed-seaming material fed therethrough upon the delivery of a driving force thereto;

a drive motor disposed within said frame assembly and having a rotatable shaft extending therefrom, said drive motor being capable of rotating said motor shaft;

a drive-coupling assembly disposed within said frame assembly, said drive-coupling assembly cooperating with said drive motor and said plain-seaming and closed-seaming head-assemblies to selectively deliver a driving force to at least one of said plain-seaming and closed-seaming head-assemblies in response to rotation of said motor shaft whereby at least one of said plain-seaming and closed-seaming head-assemblies sews together material fed therethrough; and a turntable for selectively allowing rotation of said sewing machine.

* * * * *